(12) United States Patent
Willén et al.

(10) Patent No.: US 12,512,236 B2
(45) Date of Patent: Dec. 30, 2025

(54) SUPERCONDUCTING POWER CABLE SYSTEM

(71) Applicant: NKT Cables Group A/S, Brøndby (DK)

(72) Inventors: Dag Willén, Klagshamn (SE); Carsten Thidemann, Jaegerspris (DK)

(73) Assignee: NKT CABLES GROUP A/S, Brønby (DK)

( * ) Notice: Subject to any disclaimer, the term of this patent is extended or adjusted under 35 U.S.C. 154(b) by 882 days.

(21) Appl. No.: 17/660,301

(22) Filed: Apr. 22, 2022

(65) Prior Publication Data

US 2022/0359104 A1    Nov. 10, 2022

(30) Foreign Application Priority Data

May 4, 2021 (EP) ..................................... 21172174

(51) Int. Cl.
*H01B 12/16* (2006.01)
*H01R 4/68* (2006.01)
*H02G 15/34* (2006.01)

(52) U.S. Cl.
CPC ............... *H01B 12/16* (2013.01); *H01R 4/68* (2013.01); *H02G 15/34* (2013.01)

(58) Field of Classification Search
CPC ...................................................... H01B 12/16
See application file for complete search history.

(56) References Cited

U.S. PATENT DOCUMENTS

| | | |
|---|---|---|
| 3,463,869 A | 8/1969 | Cooley et al. |
| 3,697,665 A | 10/1972 | Doose et al. |

(Continued)

FOREIGN PATENT DOCUMENTS

| | | |
|---|---|---|
| DE | 4323028 A1 | 1/1995 |
| DE | 102004055553 A1 | 5/2006 |

OTHER PUBLICATIONS

Extended European Search Report; Application No. 21172174.1; Completed: Oct. 14, 2021; Issued: Oct. 22, 2021; 8 Pages.

(Continued)

*Primary Examiner* — Paul A Wartalowicz
(74) *Attorney, Agent, or Firm* — Whitmyer IP Group LLC

(57) ABSTRACT

A superconducting power cable system, including: a superconducting power cable including a cryostat, a first cooling station, a second cooling station, wherein the superconducting power cable extends between the first cooling station and the second cooling station, wherein the first cooling station is configured to pump cooling fluid into the cryostat in a first direction towards the second cooling station and the second cooling station is configured to pump cooling fluid into the cryostat in a second direction, opposite to the first direction, towards the first cooling station, an access pipe assembly arranged between the first cooling station and the second cooling station, the access pipe assembly extending into the cryostat for tapping cooling fluid flowing from the first cooling station and the second cooling station from the cryostat, and a return pipe structure arranged externally to the superconducting power cable, the return pipe structure connecting the access pipe assembly to the first cooling station and to the second cooling station, and providing a respective return cooling fluid line from the cryostat through the access pipe assembly to the first cooling station and to the second cooling station.

16 Claims, 1 Drawing Sheet

(56) References Cited

U.S. PATENT DOCUMENTS

| | | | |
|---|---|---|---|
| 3,946,141 A | 3/1976 | Schmidt | |
| 10,485,145 B2* | 11/2019 | Cullen | H02G 3/04 |
| 2007/0107443 A1 | 5/2007 | Royal et al. | |
| 2007/0137881 A1* | 6/2007 | Ashibe | H02G 15/34 |
| | | | 174/125.1 |
| 2012/0186854 A1 | 7/2012 | Choi et al. | |
| 2013/0141262 A1 | 6/2013 | Hays et al. | |
| 2014/0221213 A1* | 8/2014 | Fukuda | H01B 12/16 |
| | | | 174/15.5 |
| 2020/0244130 A1 | 7/2020 | Palmer | |

OTHER PUBLICATIONS

European Office Action; Application No. 2111721174.1; Completed Dec. 12, 2024; 8 Pages.

* cited by examiner

SUPERCONDUCTING POWER CABLE SYSTEM

TECHNICAL FIELD

The present disclosure generally relates to superconducting power cables.

BACKGROUND

Superconducting power cables use superconducting material as conductor, usually in the form of a tape layer. An electrical insulation is provided over the superconducting material. A mechanically flexible inner cryostat tube is arranged over the electrical insulation. The inner cryostat tube is typically followed by a super insulation, and an outer cryostat tube. Liquid coolant such as liquid nitrogen flows inside the inner cryostat tube for cooling the superconducting material to a cryogenic temperature.

A superconducting power cable installation may include the superconducting power cable as well as accessories such as joints, terminations, and cooling stations to which the cryostat is connected and from which the liquid nitrogen is pumped into the cryostat. The cooling stations are arranged at a certain maximum distance from each other to enable liquid nitrogen to cool the superconducting material efficiently.

The number of cooling stations influences the amount of material used and the required installation work, and thus the environmental impact of the superconducting power cable installation.

SUMMARY

In view of the above, an object of the present disclosure is to provide a superconducting power cable system which solves, or at least mitigates problems of the prior art.

There is hence provided a superconducting power cable system, comprising: a superconducting power cable comprising a cryostat, a first cooling station, a second cooling station, wherein the superconducting power cable extends between the first cooling station and the second cooling station, wherein the first cooling station is configured to pump cooling fluid into the cryostat in a first direction towards the second cooling station and the second cooling station is configured to pump cooling fluid into the cryostat in a second direction, opposite to the first direction, towards the first cooling station, an access pipe assembly arranged between the first cooling station and the second cooling station, the access pipe assembly extending into the cryostat for tapping cooling fluid flowing from the first cooling station and the second cooling station from the cryostat, and a return pipe structure arranged externally to the superconducting power cable, the return pipe structure connecting the access pipe assembly to the first cooling station and to the second cooling station, and providing a respective return cooling fluid line from the cryostat through the access pipe assembly to the first cooling station and to the second cooling station.

Flowing of the cooling fluid in opposite directions from two cooling stations in combination with taking the cooling fluid out from the cryostat and the superconducting power cable at a location between the first cooling station and the second cooling station, makes it possible to substantially extend the distance between the cooling stations. Thus, fewer cooling stations are required to be installed along the length of an installation of the superconducting power cable.

This effect may be achieved because strict requirements on the cooling fluid only have to be fulfilled from the cooling station to the access pipe assembly. The cooling fluid may have a higher temperature and lower pressure in the external return pipe structure than if the cooling fluid would have been directed back to the cooling stations inside the superconducting power cable.

According to one embodiment the access pipe assembly extends into the cryostat at a location of the superconducting power cable in a range of ¼ to ¾ of the length of the superconducting power cable from the first cooling station to the second cooling station.

According to one embodiment the access pipe assembly extends into the cryostat at a location of the superconducting power cable in a range at the middle of the length of the superconducting power cable between the first cooling station and the second cooling station plus/minus 10%.

If the access pipe assembly is arranged approximately halfway between the first cooling station and the second cooling station, as measured along the length of the superconducting power cable, the distance between cooling stations may essentially be doubled.

According to one embodiment the access pipe assembly is passive. The access pipe assembly does not have any components that can be actuated e.g., by a control system in this example.

According to one embodiment the access pipe assembly comprises a tee-connector connected to the cryostat and to each of the cooling fluid lines. Thus, each opening of the tee-connector is connected to a respective one of the cryostat, and the first cooling station and the second cooling station via the return pipe structure.

According to one embodiment the superconducting power cable comprises a pressure isolating wall dividing the cryostat into a first section in fluid communication with the first cooling station and a second section in fluid communication with the second cooling station, wherein the access pipe assembly provides individual access into the first section and into the second section. Thus, in case there is a pressure difference between the cable section of the superconducting power cable connected to the first cooling station and the cable section connected to the second cooling station e.g., due to substantial level differences along the installation, the cryostats of the two cable sections are pressure-isolated from each other. The two cooling loops defined by the two cable sections extending between a respective one of the first cooling station and the second cooling station and the access pipe assembly can thus be controlled individually, separate from each other.

According to one embodiment the access pipe assembly comprises a first pipe connected to the first section of the cryostat and a second pipe connected to the second section of the cryostat.

According to one embodiment the superconducting power cable comprises a cryostat joint, wherein the access pipe assembly forms part of the cryostat joint.

According to one embodiment the distance from the access pipe assembly to the first cooling station is at least 1000 m as measured along the axial extension of the superconducting power cable.

According to one embodiment the distance from the access pipe assembly to the second cooling station is at least 1000 m as measured along the axial extension of the superconducting power cable.

According to one embodiment the superconducting power cable is a multi-phase superconducting power cable.

One embodiment comprises a first splitter box and a first set of superconducting cable terminations, wherein at a first end of the multi-phase superconducting power cable the phases are split up to single phases in the first splitter box and connected to a respective one of the first set of superconducting cable terminations.

One embodiment comprises a second splitter box and a second set of superconducting cable terminations, wherein at a second end of the multi-phase superconducting power cable the phases are split up to single phases in the second splitter box and connected to a respective one of the second set of superconducting cable terminations.

According to one embodiment the superconducting power cable comprises a superconducting conductor layer arranged inside the cryostat, wherein the superconducting conductor layer has operational constraints of a maximum allowed temperature and a minimum allowed cooling fluid pressure, and wherein the cooling fluid flowing through the cooling fluid return lines has a temperature exceeding the maximum allowed temperature, a pressure that is lower than the minimum allowed cooling fluid pressure, or both.

For the superconducting conductor layer to be superconducting with a predetermined safety margin, it has to be operated at a temperature that does not exceed the maximum allowed temperature even after extreme events such as temporary over-currents. Moreover, the cooling fluid has to have a minimum allowed cooling fluid pressure with a predetermined safety margin, as otherwise the boiling point of the cooling fluid decreases and it may start to boil, for example after an extreme event such as a temporary over-current, resulting in insufficient cooling or reduced electrical insulation properties. These constraints are not necessary in the cooling fluid return lines, and at least one of them can in fact not be fulfilled if the distance between cooling stations is increased as disclosed herein.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
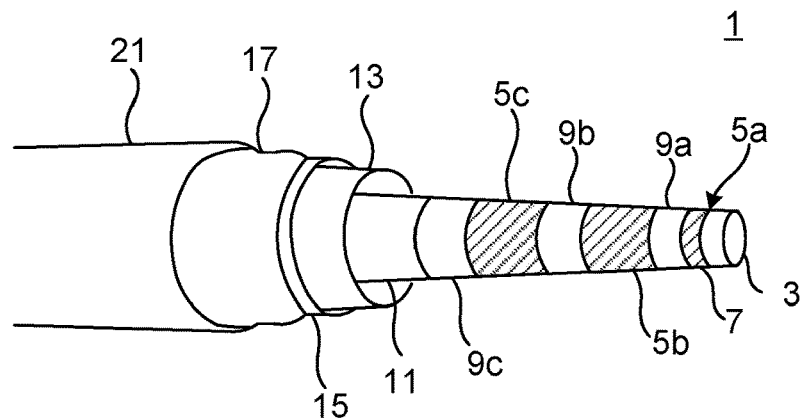
FIG. 1 schematically shows an example of a superconducting power cable.

FIG. 1 schematically shows an example of a superconducting power cable 1 for a superconducting power cable system as disclosed herein.

The exemplified superconducting power cable 1 is a multi-phase superconducting power cable. The exemplified superconducting power cable 1 has a triax configuration as shown in FIG. 1 but could alternatively have multiple power cores arranged along separate axes. The superconducting power cable could alternatively be a single-phase AC power cable or a DC power cable.

The superconducting power cable 1 may be a high voltage or a medium voltage superconducting power cable 1.

The superconducting power cable 1 comprises a former 3.

The superconducting power cable 1 comprises a superconducting conductor layer 5a arranged around the former 3. The superconducting conductor layer 5a comprises a plurality of elongated superconducting elements 7 wound helically around the former 3.

The elongated superconducting elements 7 may for example be superconducting tapes.

The superconducting power cable 1 comprises an insulation layer 9a arranged around the superconducting conductor layer 5a.

The exemplified superconducting power cable 1 comprises further superconducting conductor layers 5b and 5c and further insulation layers 9b and 9b. The second superconducting conductor layer 5b is arranged radially outside the insulation layer 9a, and the second insulation layer 9b is arranged radially outside of the second superconducting conductor layer 5b. The third superconducting conductor layer 5c is arranged radially outside of the second insulation layer 9a, and the third insulation layer 9c is arranged radially outside of the third superconducting conductor layer 5c.

The insulation layers 9a-9c may be structurally the same. The superconducting conductor layers 5a-5c may be structurally the same.

Each of the superconducting conductor layers 5a, 5b, 5c may be a respective phase conductor.

The superconducting power cable 1 comprises a screen 11 arranged around the third insulation layer 9c. The screen 11 may be made of metal material such as copper. The screen 11 may be the neutral conductor.

The superconducting power cable 1 comprises an inner cryostat tube 13 enclosing the screen 11. The cryostat 13 may be a metal tube. The cryostat 13 may be corrugated. In operation, the cooling fluid flows inside the inner cryostat tube 13. The inner cryostat tube 13 will in the following simply be referred to as "cryostat".

The cryostat 13 is in operation connected to a cooling fluid system for flowing a cooling fluid through the cryostat 13 to cool the superconducting conductor layers 5a, 5b, 5c. The cooling fluid may for example be liquid nitrogen.

The superconducting power cable 1 comprises super insulation 15 arranged around the cryostat 13. The super insulation 15 is a thermal insulation for thermally insulating the cryostat 13.

The superconducting power cable 1 comprises an outer cryostat tube 17 enclosing the super insulation 15. The outer cryostat tube 17 may be a metal tube. The outer cryostat tube 17 may be corrugated.

The superconducting power cable 1 comprises an outer sheath 21. The outer sheath 21 may for example comprise a polymeric material.

Figure 2:
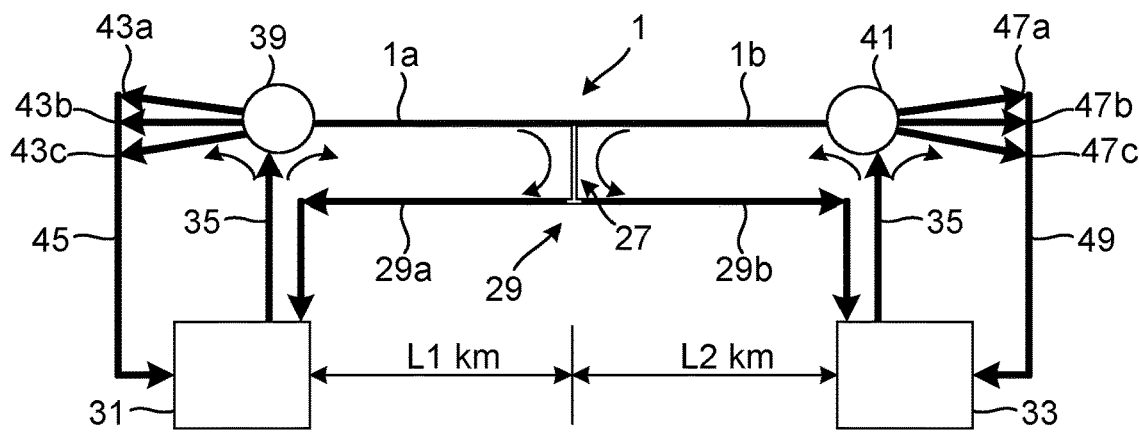
FIG. 2 schematically shows an example of a connection diagram of a superconducting power cable system.

FIG. 2 shows an example of a superconducting power cable system 23. The superconducting power cable system 23 comprises the superconducting power cable 1.

The superconducting power cable system 23 comprises a first cooling station 31 and a second cooling station 33. The superconducting power cable 1 extends between the first cooling station 31 and the second cooling station 33.

The cryostat 13 is connected to the first cooling station 31 and to the second cooling station 33.

The first cooling station 31 comprises a pump configured to pump cooling fluid into the cryostat 13 towards the second cooling station 33. The second cooling station 33 comprises a pump configured to pump cooling fluid into the cryostat 13 towards the first cooling station 31.

The superconducting power cable system 23 comprises an access pipe assembly 27. The access pipe assembly 27 is arranged between the first cooling station 31 and the second cooling station 33. The access pipe assembly 27 extends into the cryostat 13 and provides external access into the cryostat 13. In the example shown in FIG. 2, the access pipe assembly 27 comprises a tee-connector or T-connector.

The access pipe assembly 27 extends into the cryostat at a location of the superconducting power cable 1 in a range of ¼ to ¾ of the length of the superconducting power cable 1 from the first cooling station 31 to the second cooling station 33. The location may be in a range at the middle of the length of the superconducting power cable 1 between the first cooling station 31 and the second cooling station 33 plus/minus 10%, plus/minus 5%, plus/minus 2.5%, or plus/minus 1%.

The superconducting power cable system 23 comprises a return pipe structure 29 connected to the access pipe assembly 27, to the first cooling station 31 and to the second cooling station 33. The return pipe structure 29 forms a return cooling fluid line for the cooling fluid from the cryostat 13 from the location of the access pipe assembly 27 to the first cooling station 31 and to the second cooling station 33. The return pipe structure 29 is arranged externally to the superconducting power cable 1.

In the example shown in FIG. 2, the return pipe structure 29 comprises a first return pipe 29a connected to one opening of the access pipe assembly 27 and to the first cooling station 31 and a second return pipe 29b connected to another opening of the access pipe assembly 27 and to the second cooling station 33. The third opening of the access pipe assembly 27 is connected to the cryostat 13.

The access pipe assembly 27 may be passive. The access pipe assembly 27 is thus more robust.

The superconducting power cable 1 may comprise a cryostat joint, which connects two sections of the cryostat. The access pipe assembly 27 may form part of the cryostat joint.

The superconducting power cable 1 has a first cable section 1a extending between the first cooling station 31 and the access pipe assembly 27. The superconducting power cable 1 has a second cable section 1b extending between the second cooling station 33 and the access pipe assembly 27.

The first cable section 1a may for example have a length L of at least 1000 m. The second cable section 1b may for example have a length L of at least 1000 m.

The exemplified superconducting power cable system 23 comprises a first splitter box 39 and a second splitter box 41. The superconducting power cable 23 is connected to the first splitter box 39 at one end and to the second splitter box 41 at its other end.

The superconducting power cable 23 is split into a plurality of single phases in the first splitter box 39.

The superconducting power cable 23 is split into a plurality of single phases in the second splitter box 41.

The exemplified superconducting power cable system 23 comprises a first set of superconducting cable terminations 43a-43c.

The single phases extending from the first splitter box 39 are connected to a respective one of the first set of superconducting cable terminations 43a-43c.

The exemplified superconducting power cable system 23 comprises a second set of superconducting cable terminations 47a-47c.

The single phases extending from the second splitter box 41 are connected to a respective one of the second set of superconducting cable terminations 47a-47c.

According to the example in FIG. 2, the first cooling station 31 has a first cooling fluid line 35 connected to the first splitter box 39, supplying cooling fluid to the first splitter box 39.

The first splitter box 39 is constructed such that the cooling fluid supplied by the first cooling station 31 via the first cooling fluid line 35 is distributed to a respective cryostat of the single phases leading to the first set of superconducting cable terminations 43a-43c and to the cryostat 13 of the superconducting power cable 1, towards the second cooling station 33.

The first cooling station 31 has a first termination return line 45 connected to the first set of superconducting cable terminations 43a-43c for collecting cooling fluid from the first set of superconducting cable terminations 43a-43c and return the cooling fluid to the first cooling station 31.

According to the example in FIG. 2, the second cooling station 33 has a second cooling fluid line 37 connected to the second splitter box 41, supplying cooling fluid to the second splitter box 41.

The second splitter box 41 is constructed such that the cooling fluid supplied by the second cooling station 33 via the second cooling fluid line 37 is distributed to a respective cryostat of the single phases leading to the second set of superconducting cable terminations 47a-47c and to the cryostat 13 of the superconducting power cable 1, towards the first cooling station 31.

The second cooling station 33 has a second termination return line 49 connected to the second set of superconducting cable terminations 4a-47c for collecting cooling fluid from the second set of superconducting cable terminations 47a-47c and return the cooling fluid to the second cooling station 33.

The cooling fluid that exits the cryostat 13 via the access pipe assembly 27 flows back towards the first cooling station 31 and towards the second cooling station 33.

Figure 3:
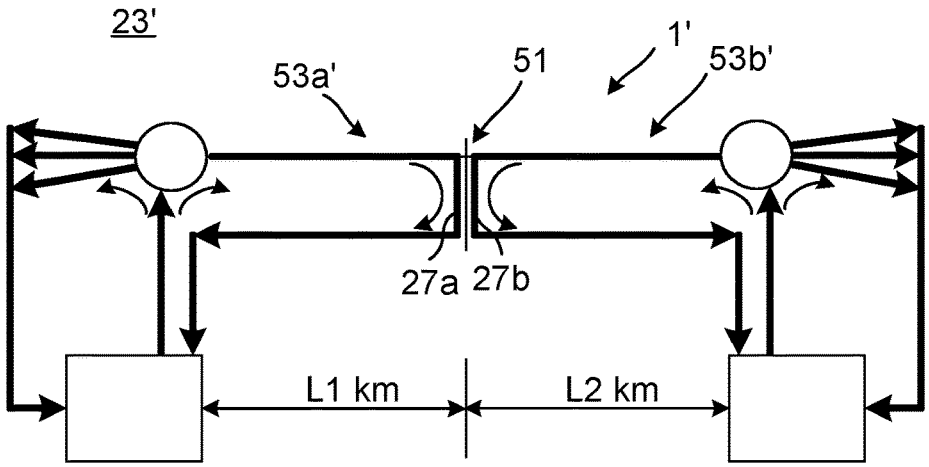
FIG. 3 schematically shows another example of a connection diagram of a superconducting power cable system.

FIG. 3 shows another example of a superconducting power cable system 23' similar to the superconducting power cable system 23. The superconducting power cable 1' of the superconducting power cable system 23' however comprises a pressure isolating tube 51 dividing the cryostat 13 into two isolated cryostat sections 53a' and 53b'. The pressure isolating tube 51 may for example be made of metal, such as the same material as the cryostat 13. The first cable section and the second cable section thus have a respective cryostat section 53a', 53b' which are isolated from each other. The first section 53a' is in fluid communication with the first cooling station 31 and the second section 53b' is in fluid communication with the second cooling station 33.

The access pipe assembly provides individual access into the first section 53a' and into the second section 53b'. The access pipe assembly comprises a first pipe connected to the first section 53a' and a second pipe connected to the second section 53b'. The cooling fluid exits the cryostat 13 at one side of the pressure isolating wall 51 via the first pipe and flows back to the first cooling station. At the other side of the pressure isolating wall 51 the cooling fluid exits the cryostat 13 via the second pipe and flows back to the second cooling station. The fluid flows are otherwise the same as in the example shown in FIG. 2.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A superconducting power cable system, comprising:
a multi-phase superconducting power cable comprising a cryostat,
a first cooling station,
a second cooling station,
wherein the multi-phase superconducting power cable extends between the first cooling station and the second cooling station,
wherein the first cooling station is configured to pump cooling fluid into the cryostat in a first direction towards the second cooling station and the second cooling station is configured to pump cooling fluid into the cryostat in a second direction, opposite to the first direction, towards the first cooling station,
an access pipe assembly arranged between the first cooling station and the second cooling station, the access pipe assembly extending into the cryostat for tapping cooling fluid flowing from the first cooling station and the second cooling station from the cryostat,
a return pipe structure arranged externally to the multi-phase superconducting power cable, the return pipe structure connecting the access pipe assembly to the first cooling station and to the second cooling station, and providing a respective return cooling fluid line from the cryostat through the access pipe assembly to the first cooling station and to the second cooling station, and
a first splitter box and a first set of superconducting cable terminations, wherein at a first end of the multi-phase superconducting cable the phases are split up to single phases in the first splitter box and connected to a respective one of the first set of superconducting cable terminations,
wherein the first cooling station has a first cooling fluid line connected to the first splitter box, supplying cooling fluid to the first splitter box,
wherein the first splitter box is constructed such that the cooling fluid supplied by the first cooling station via the first cooling fluid line is distributed to a respective cryostat of the single phases leading to the first set of superconducting cable terminations and to the cryostat of the multi-phase superconducting power cable, towards the second cooling station.

2. The superconducting power cable system as claimed in claim 1, wherein the access pipe assembly extends into the cryostat at a location of the superconducting power cable in a range of ¼ to ¾ of the length of the superconducting power cable from the first cooling station to the second cooling station.

3. The superconducting power cable system as claimed in claim 2, wherein the access pipe assembly extends into the cryostat at a location of the superconducting power cable in a range at the middle of the length of the superconducting power cable between the first cooling station and the second cooling station plus/minus 10%.

4. The superconducting power cable system as claimed in claim 2, wherein the access pipe assembly is passive.

5. The superconducting power cable system as claimed in claim 2, wherein the access pipe assembly comprises a tee-connector connected to the cryostat and to each of the cooling fluid lines.

6. The superconducting power cable system as claimed in claim 2, wherein the superconducting power cable comprises a pressure isolating wall dividing the cryostat into a first section in fluid communication with the first cooling station and a second section in fluid communication with the second cooling station, wherein the access pipe assembly provides individual access into the first section and into the second section.

7. The superconducting power cable system as claimed in claim 1, wherein the superconducting power cable comprises a pressure isolating wall dividing the cryostat into a first section in fluid communication with the first cooling station and a second section in fluid communication with the second cooling station, wherein the access pipe assembly provides individual access into the first section and into the second section.

8. The superconducting power cable system as claimed in claim 7, wherein the access pipe assembly comprises a first pipe connected to the first section of the cryostat and a second pipe connected to the second section of the cryostat.

9. The superconducting power cable system as claimed in claim 1, wherein the access pipe assembly extends into the cryostat at a location of the superconducting power cable in a range at the middle of the length of the superconducting power cable between the first cooling station and the second cooling station plus/minus 10%.

10. The superconducting power cable system as claimed in claim 1, wherein the access pipe assembly is passive.

11. The superconducting power cable system as claimed in claim 1, wherein the access pipe assembly comprises a tee-connector connected to the cryostat and to each of the cooling fluid lines.

12. The superconducting power cable system as claimed in claim 1, wherein the superconducting power cable comprises a cryostat joint, wherein the access pipe assembly forms part of the cryostat joint.

13. The superconducting power cable system as claimed in claim 1, wherein the distance from the access pipe assembly to the first cooling station is at least 1000 m as measured along the axial extension of the superconducting power cable.

14. The superconducting power cable system as claimed in claim 1, wherein the distance from the access pipe assembly to the second cooling station is at least 1000 m as measured along the axial extension of the superconducting power cable.

15. The superconducting power cable system as claimed in claim 1, comprising a second splitter box and a second set of superconducting cable terminations, wherein at a second end of the multi-phase superconducting power cable the phases are split up to single phases in the second splitter box and connected to a respective one of the second set of superconducting cable terminations.

16. The superconducting cable system as claimed in claim 1, wherein the superconducting power cable comprises a superconducting conductor layer arranged inside the cryostat, wherein the superconducting conductor layer has operational constraints of a maximum allowed temperature and a minimum allowed cooling fluid pressure, and wherein the cooling fluid flowing through the cooling fluid return lines has a temperature exceeding the maximum allowed temperature, a pressure that is lower than the minimum allowed cooling fluid pressure, or both.

* * * * *